United States Patent
Reilly

(10) Patent No.: US 8,272,402 B2
(45) Date of Patent: *Sep. 25, 2012

(54) SEQUENTIAL STEPPED DIRECTIONAL CONTROL VALVE

(75) Inventor: Joseph Patrick Reilly, Lincolnshire, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/374,407

(22) Filed: Dec. 27, 2011

(65) Prior Publication Data

US 2012/0118418 A1    May 17, 2012

Related U.S. Application Data

(63) Continuation of application No. 12/229,741, filed on Aug. 26, 2008, now Pat. No. 8,104,511.

(60) Provisional application No. 60/968,114, filed on Aug. 27, 2007.

(51) Int. Cl.
F16K 31/06    (2006.01)

(52) U.S. Cl. ......... 137/625.65; 137/625.67; 137/625.68; 251/129.15

(58) Field of Classification Search ............. 137/625.65, 137/625.67, 625.25, 625.68, 625.69; 251/129.15
See application file for complete search history.

(56) References Cited

U.S. PATENT DOCUMENTS

| | | |
|---|---|---|
| 3,717,212 A | 2/1973 | Potter |
| 3,995,652 A | 12/1976 | Belart et al. |
| 4,211,255 A | 7/1980 | Wisbey et al. |
| 4,342,443 A | 8/1982 | Wakeman |
| 4,422,475 A | 12/1983 | Aspinwall |
| 4,483,369 A | 11/1984 | Akagi et al. |
| 4,565,219 A | 1/1986 | Kunogi |
| 4,681,143 A | 7/1987 | Sato et al. |
| 4,823,842 A | 4/1989 | Toliusis |
| 4,873,912 A | 10/1989 | Schulze |
| 5,007,459 A | 4/1991 | Asaoka |
| 5,117,869 A | 6/1992 | Kolchinsky |
| 5,205,323 A | 4/1993 | Baker |
| H1191 H | 6/1993 | Hutchison et al. |
| 5,249,603 A | 10/1993 | Byers, Jr. |
| 5,832,808 A | 11/1998 | Ishizaki et al. |

(Continued)

FOREIGN PATENT DOCUMENTS

GB    2344406 B    6/2003

(Continued)

Primary Examiner — Eric Keasel
Assistant Examiner — Minh Le
(74) Attorney, Agent, or Firm — Renner, Otto, Boisselle & Sklar, LLP

(57) ABSTRACT

A sequential stepped directional control valve accepts pressurized hydraulic fluid from a pressure port, and directs that pressurized fluid to a first stage port, or to both a first stage port and a second stage port. In the neutral position, the valve blocks the flow of pressurized hydraulic fluid into the valve. In the first stage position, pressurized hydraulic fluid flows into the valve and is directed by the valve to the first stage port, however, the pressurized fluid flow to the second stage port is blocked. In the second stage position, pressurized hydraulic fluid flows into the valve and is directed to both the first and second stage ports. When the valve transitions from the first stage position to the second stage position, the valve does not cycle through a neutral position, and the flow of pressurized hydraulic fluid to the first stage port is uninterrupted.

20 Claims, 3 Drawing Sheets

U.S. PATENT DOCUMENTS

| | | | |
|---|---|---|---|
| 5,832,996 A | | 11/1998 | Carmody et al. |
| 5,878,782 A | | 3/1999 | Nakajima |
| 5,960,831 A | * | 10/1999 | Borcea et al. ............ 137/625.65 |
| 6,315,268 B1 | | 11/2001 | Cornea et al. |
| 6,474,353 B1 | | 11/2002 | Sturman et al. |
| 6,681,806 B2 | | 1/2004 | Isobe |
| 6,883,544 B2 | | 4/2005 | Kawamura et al. |
| 6,974,117 B2 | | 12/2005 | Dzialakiewicz et al. |
| 7,007,925 B2 | | 3/2006 | Nordstrom et al. |
| 7,172,171 B2 | | 2/2007 | Doehla et al. |
| 2002/0134444 A1 | | 9/2002 | Isobe |
| 2007/0131289 A1 | * | 6/2007 | Pataki ...................... 137/625.65 |
| 2007/0246112 A1 | * | 10/2007 | Aranovich ............... 137/625.65 |

FOREIGN PATENT DOCUMENTS

| | | |
|---|---|---|
| JP | 07-127666 | 5/1995 |
| JP | 2006-127332 | 5/2006 |

* cited by examiner

SEQUENTIAL STEPPED DIRECTIONAL CONTROL VALVE

CROSS-REFERENCE TO RELATED APPLICATIONS

This application is a continuation of co-pending U.S. application Ser. No. 12/229,741, filed Aug. 26, 2008, now U.S. Pat. No. 8,104,511 which, in turn, claims the benefit of and priority from U.S. Provisional application Ser. No. 60/968,114, filed Aug. 27, 2007. The prior application, including the entire written description and drawing figures, is hereby incorporated by reference into the present application.

BACKGROUND OF THE INVENTION

1. Field of the Invention

The present invention relates generally to three position hydraulic valves used in a wide variety of hydraulic applications. Hydraulic valves of this sort may be utilized, for example, to cause piston movement and thereby cause operation of hydraulic equipment. One example of such an application would be engine brakes. The present invention relates to an improved design for such hydraulic valves.

2. Brief Description of the Related Art

Prior art or traditional three position valves utilized two solenoid coils, with one solenoid associated with a pull pole piece and one solenoid associated with a push pole piece. A plunger was oriented between the two pole pieces with the neutral position for the plunger being mid-stroke between them. One or more return springs were provided for returning the plunger to the neutral mid-stroke position between the push and pull pole pieces.

When electrical current was applied to one of the solenoid coils, a magnetic force was created in the associated pole piece (either the push pole piece or the pull pole piece, respectively) which caused the magnetically responsive plunger to attempt to close the air gap between the magnetically operational pole piece and the plunger, causing the return spring or springs to compress. When the electrical current was removed from the solenoid, the magnetic force in the operational pole piece was removed, and the springs returned the plunger to the neutral mid-stroke position. The plunger movement was, in turn, mechanically transmitted to a spool type directional control valve, which, directed hydraulic fluid flow. On a traditional two coil, three position valve, the valve was required to move through a neutral position in order to transition from a first operating position (e.g., with the plunger magnetically attracted to push pole piece) to a second operating position (e.g., with the plunger magnetically attracted to pull pole piece).

The present invention, called a sequential stepped directional control valve, overcomes the problems associated with traditional three position valves. The present invention does not involve transitioning through a non-operational neutral position in order to change from a first stage operational position to a second stage operational position. Depending on the nature of the hydraulic application, such a transition through a neutral position, as described in more detail below, can be highly disadvantageous, dangerous, or even deadly. The present invention, moreover, is economical, and involves less parts that can lead to failure. Whereas traditional prior art three position hydraulic valves required two solenoids, and two pole pieces (a push and pull pole piece), the present invention requires only a single solenoid and a single pole piece, saving costs and decreasing complexity. By eliminating the extra traditional parts, the present invention can achieve a savings in size as well.

BRIEF SUMMARY OF THE INVENTION

In view of the foregoing, it is an object of the present embodiments of the invention described herein to provide a hydraulic valve, called a sequential stepped directional control valve, that overcomes the shortcomings of the prior art traditional three position hydraulic valves, while still achieving the functions and benefits of prior systems.

In particular, it is an object of the embodiments of the invention to achieve a linear sequential stepped directional control valve that utilizes a single solenoid, a single plunger, and a single pull pole piece, biased by multiple sequenced preloaded springs to achieve multiple operating positions.

It is a further object of the embodiments of the invention to control the stages or operating positions of the valve of the present invention by controlling the electrical current applied to the single solenoid by applying the desired magnitude of electrical current required for the sequential stage or position.

It is another object of the embodiments of the invention to provide a sequential stepped directional control valve that is capable of transitioning from a non-neutral first stage (wherein hydraulic fluid under pressure is directed to a first stage port for utilization by a first hydraulic application) to a non-neutral second stage (wherein pressurized hydraulic fluid is directed, in addition, to a second stage port for utilization by a second hydraulic application) without transitioning through a neutral stage (wherein pressurized hydraulic fluid is not directed to the first stage port or the second stage port).

Still another object of the embodiments of the invention described herein is to achieve proportional control of the sequential stepped directional control valve by, inter alia, the application of Pulse Width Modulated current to the solenoid of the valve.

A still further object of the present embodiments of the invention described herein is to achieve the above objects in a manner that is cost-efficient.

Yet another object of the embodiments of the invention described herein is to achieve the foregoing objects while decreasing the size or weight of the valve, as compared to prior art valves.

The disclosed embodiments of the sequential stepped directional control valve achieve the aforementioned objects, and others, because they include features and combinations not found in prior art valves, and, in particular, not found in prior art three position hydraulic valves.

In the described embodiments of the present invention, an improved hydraulic valve, called a sequential stepped directional control valve, is provided, wherein the valve is inserted into a valve bore in the body of an application (hydraulically operated equipment). The valve bore is in hydraulic communication with a pressure port (hydraulically connected to a source of pressurized hydraulic fluid), a tank port (hydraulically connected to an unpressurized hydraulic fluid tank), a first stage port (hydraulically connected to a first hydraulic application), and a second stage port (hydraulically connected to a second hydraulic application).

The principal embodiment of the sequential stepped directional control valve described herein has three stages or positions: a neutral stage, a first stage, and a second stage. Pressurized hydraulic fluid is provided through the pressure port to the sequential stepped directional control valve. In the neutral stage, an axially moving spool within the valve is biased to be in the neutral position, preferably by two springs.

In the neutral position, the spool blocks the pressurized hydraulic fluid from entering the sequential stepped directional control valve, and the pressurized hydraulic fluid is not directed by the valve to either the first stage port or the second stage port. Instead, the spool in the neutral position permits hydraulic fluid from both the first stage port and the second stage port to enter the valve and drain through the hollow central spool passage in the spool to the unpressurized tank port, relieving hydraulic pressure in both the first stage port and the second stage port. In the absence of pressurized hydraulic fluid, the hydraulic applications connected to the first stage port and the second stage port do not operate.

When a first predetermined electrical current is applied to the solenoid in the sequential stepped directional control valve, a magnetic pulling force is created via a pull pole piece which pulls a plunger attached to the spool partway toward the pull pole piece, partially overcoming the force applied to the plunger by the valve's springs, to a first stage position. In the first stage position, the spool has moved to a position wherein the spool no longer blocks hydraulic communication between the valve's interior and the pressure port, so as to permit pressurized hydraulic fluid from the pressure port to enter the sequential stepped directional control valve. The spool directs the pressurized hydraulic fluid to the first stage ports via a first spool cavity which, in the first stage position, is simultaneously in hydraulic communication with both pressure port and the first stage port. In the first stage position, the spool permits hydraulic fluid to flow from the second stage port, draining through the hollow central spool passage in the spool to the unpressurized tank port, thereby relieving hydraulic pressure in the second stage port. Because pressurized hydraulic fluid has been directed to the first stage port when the spool is in the first stage position, the hydraulic application connected to the first stage port is capable of operation. Conversely, because the second stage port is relieved of hydraulic pressure, the hydraulic application connected to the second stage port is inactivated.

By applying a second (greater) predetermined electrical current to the solenoid, the magnetic pulling force in the pull pole piece is increased, and the plunger attached to the spool is pulled closer to the pull pole piece, further overcoming the force exerted on the plunger by the valve's springs, to a second stage position. In the second stage position, and throughout the transition from the first stage position to the second stage position, the spool is in a position that allows pressurized hydraulic fluid to enter the sequential stepped directional control valve, and the spool directs that pressurized hydraulic fluid to the first stage port via the first spool cavity which is simultaneously in hydraulic communication with both the pressure port and the first stage port. Also in the second stage position, the spool directs pressurized hydraulic fluid to flow from a first stage cavity adjacent the first stage port to the second stage port via a second spool cavity. In the second stage position, the second spool cavity is simultaneously in hydraulic communication with the first stage port (which has pressurized hydraulic fluid directed to it from the pressure port by the first spool cavity) and the second stage port. Thus, pressurized hydraulic fluid is directed to both the first stage port and the second stage port. At the same time, the spool is positioned so as to prevent pressurized hydraulic fluid from either the first stage port or the second stage port from draining into the hollow central spool passage in the spool to the unpressurized tank port. Because the sequential stepped directional control valve has directed pressurized hydraulic fluid to both the first stage port and the second stage port, the hydraulic applications connected to the first sage port and the second stage port are both capable of operation.

Importantly, because the sequential stepped directional control valve continued to direct pressurized hydraulic fluid to the first stage port throughout (and after) the transition of the spool from the first stage position to the second stage position, the first stage application was operational throughout the transition. Stated another way, in transitioning from the first stage position (with pressurized hydraulic fluid directed to the first stage port) to the second stage position (with pressurized hydraulic fluid directed to both the first stage port and second stage port), at no time during the transition did the sequential stepped directional control valve cycle through a neutral position (wherein no pressurized hydraulic fluid would be directed to the first stage port or second stage port).

DETAILED DESCRIPTION OF THE INVENTION

Figure 1:
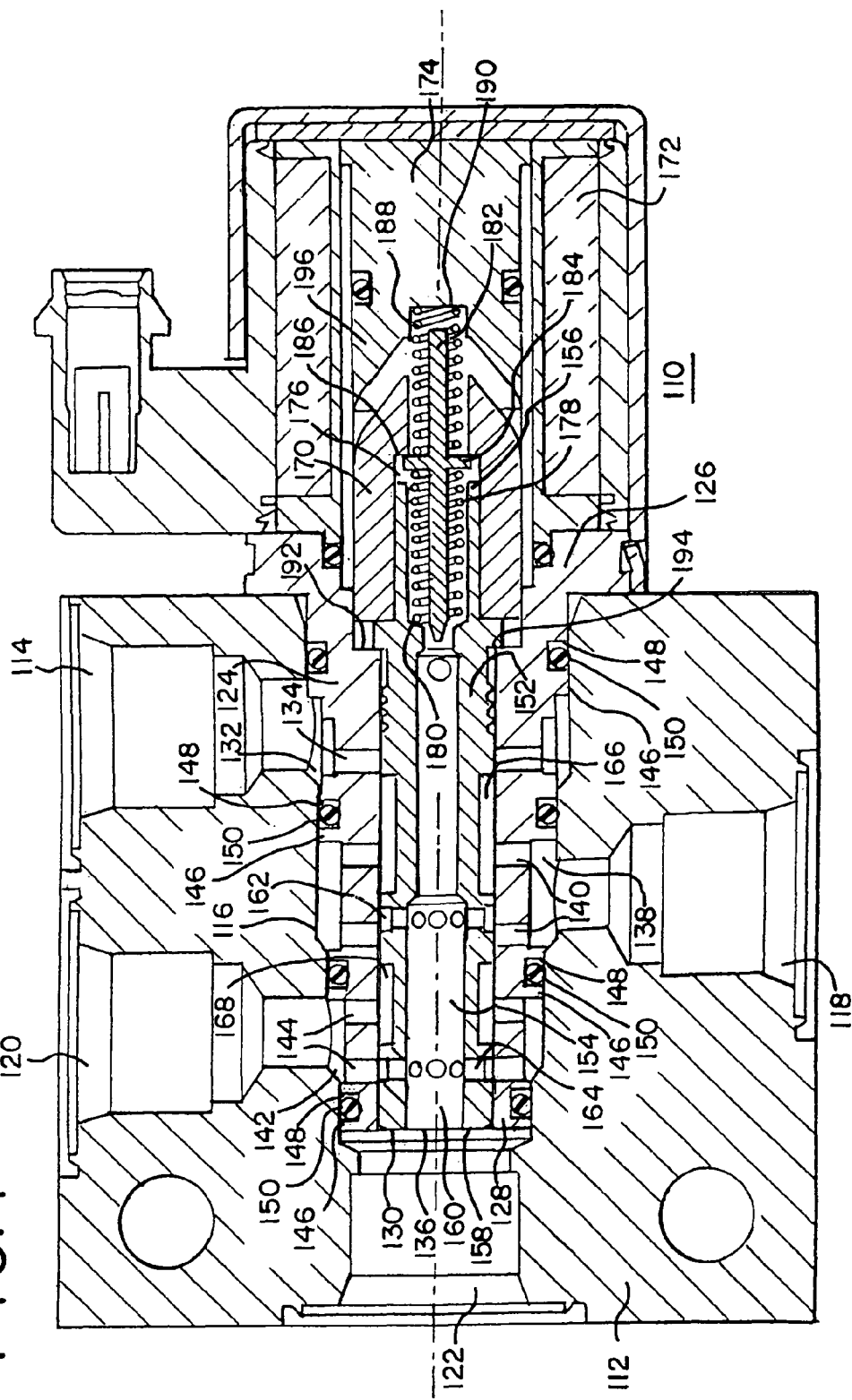
FIG. 1 is a cross-sectional view illustrating an embodiment of the invention with the spool in the neutral position.
Figure 2:
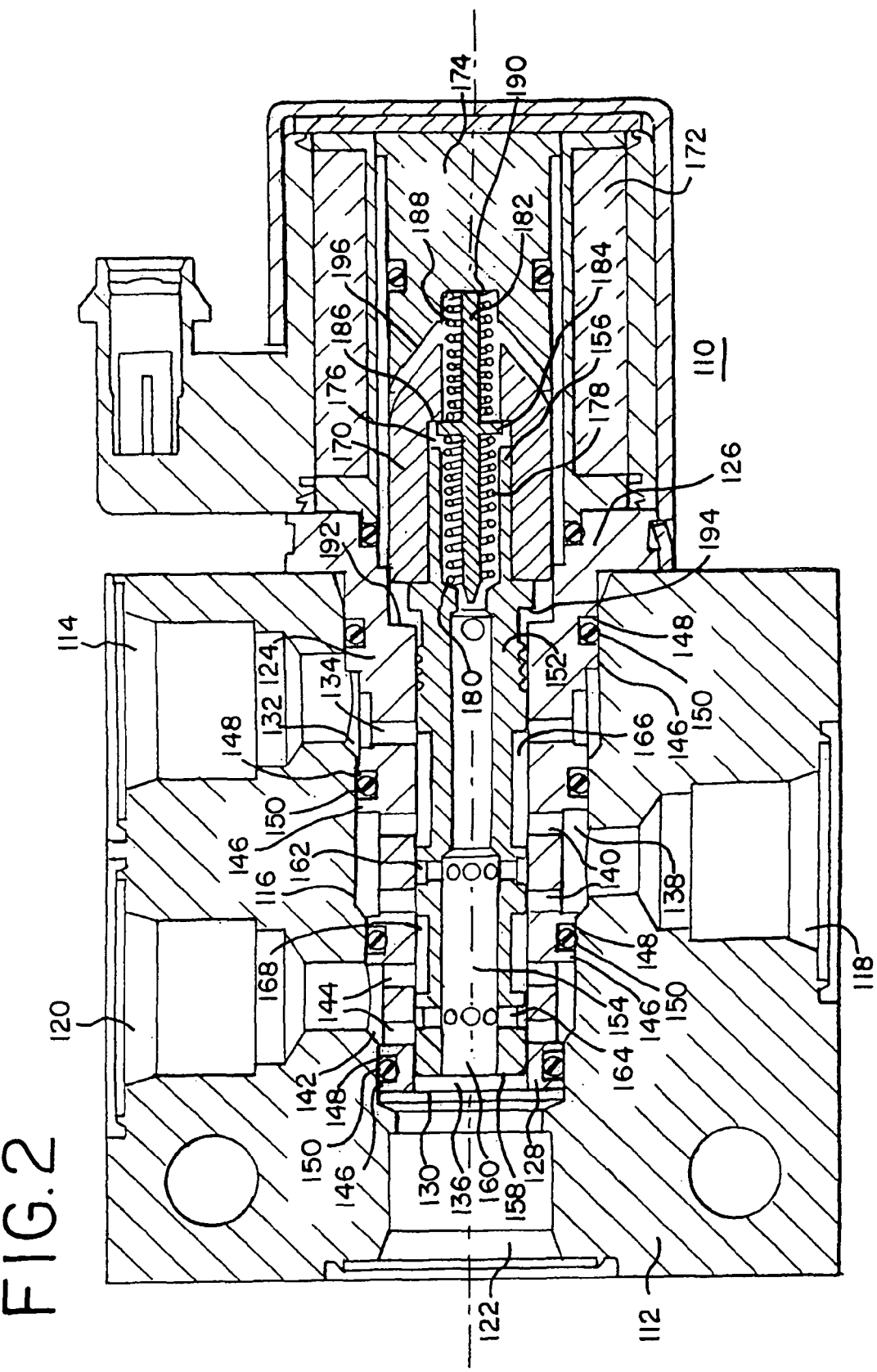
FIG. 2 is a cross-sectional view of the embodiment of the invention of FIG. 1 with the spool in the first stage position.
Figure 3:
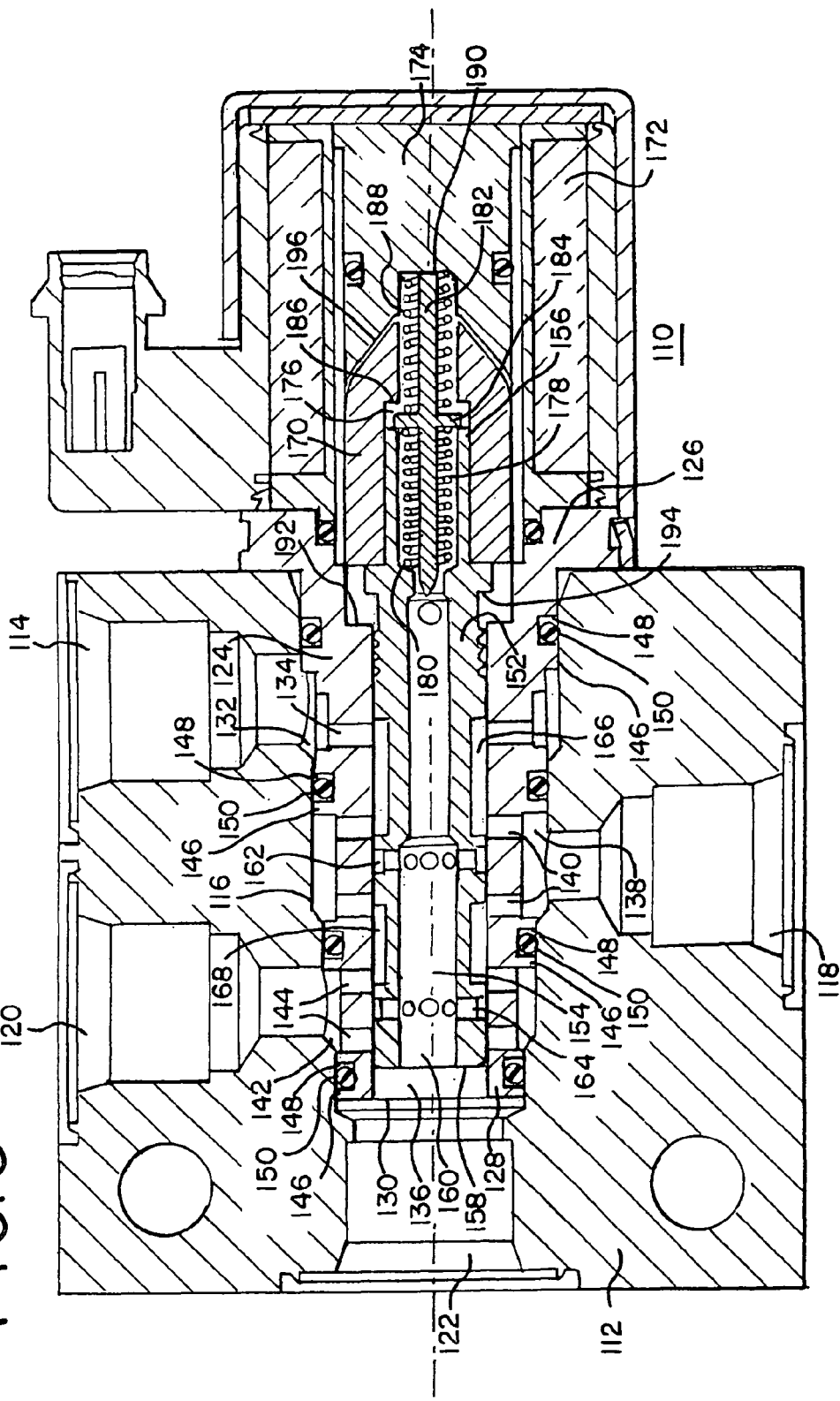
FIG. 3 is a cross-sectional view of the embodiment of the invention of FIG. 1 with the spool in the second stage position.

An embodiment of the sequential stepped directional control valve 110 of the present invention is illustrated in FIGS. 1-3 in a manner that would be understood by persons skilled in the art. For purposes of this description, the sequential stepped directional control valve 110 shall have a distal end or direction oriented in the direction of the tank port 122 and a proximal end or direction oriented in the direction of the portion of the sequential stepped directional control valve 110 opposite from the tank port 122. The lengthwise direction of the sequential stepped directional control valve 110 illustrated by the broken center line in FIGS. 1-3 shall be referred to generally as the axial direction, while the radial direction of the sequential stepped directional control valve 110 is transverse to the axial direction.

A body 112 in which the sequential stepped directional control valve 110 is utilized is illustrated in FIGS. 1-3. The body 112 may be found in any number of hydraulic applications for which stepped directional control valves are utilized, for example, in an engine brake.

The body 112 contains a valve bore 116 formed in the body in an axial direction, into which the sequential stepped directional control valve 110 is inserted. Preferably extending generally radially through the body 112 from the valve bore 116 is the pressure port 114 which delivers hydraulic fluid under pressure. The hydraulic fluid provided by the pressure port 114 is typically delivered under pressure by a hydraulic pump (not illustrated), and is pumped from a hydraulic connection to an unpressurized hydraulic fluid tank (not illustrated). A first stage port 118 and a second stage port 120 also preferably extend generally radially through the body 112 from the valve bore 116. The first stage port 118 is hydraulically connected to whatever hydraulically operated device is desired to be operated initially in a sequence, and the second stage port 120 is hydraulically connected to a hydraulically operated device desired to be operated secondarily in a sequence, when the sequential stepped directional control valve 110 is caused to move from a neutral position (FIG. 1) to a first stage (FIG. 2) and then to a second stage (FIG. 3), respectively. For example, the first stage port 118 may be hydraulically connected to a device that provides light engine braking, and the second stage port 120 may be connected hydraulically to a device that provides heavy engine braking.

Referring once again to FIGS. 1-3, tank port 122 extends through the body 112 and is connected preferably in a substantially axial direction to the valve bore 116. Tank port 122 is typically connected hydraulically to an unpressurized hydraulic fluid tank (not illustrated).

As discussed previously, the valve bore 116 is formed in the body 112 to receive the sequential stepped directional control valve 110, which has a hollow, somewhat cylindrically shaped cage 124 that forms the outside surface of the portion of the sequential stepped directional control valve 110 that is inserted into the body 112. Formed in the interior of the cage 124 is an axially extending cage central passage 136. Cage 124 has a proximal end 126 and a distal end 128. Formed at the distal end 128 of the cage 124 is a cage tank port 130 connecting hydraulically to the hollow cage central passage 136. The cage tank port 130 connects hydraulically to tank port 122.

Located in the valve bore 116 adjacent to the pressure port 114 is an annular pressure port cavity 132 encircling the cage 124. The pressure port cavity 132 is formed between the inner wall of the valve bore 116 and the outer wall of the cage 124. Formed through the wall of the cage 124 adjacent the pressure port cavity 132 are one or more cage pressure ports 134 that are capable of permitting hydraulic fluid flow between the pressure port cavity 132 and the hollow interior cage central passage 136.

Also located in the valve bore 116, but adjacent to the first stage port 118 is an annular first stage cavity 138 encircling the cage 124. The first stage cavity 138 is formed between the outer wall of the cage 124 and the inner wall of the valve bore 116. One or more cage first stage ports 140 are formed through the wall of the cage 124 adjacent the first stage cavity 138 that are capable of permitting hydraulic fluid flow between the first stage cavity 138 and the cage central passage 136.

In addition, located in the valve bore 116 adjacent to the second stage port 120 is an annular second stage cavity 142 encircling the cage 124, formed between the outer wall of the cage 124 and the inner wall of the valve bore 116. One or more cage second stage ports 144 are formed though the wall of the cage 124 adjacent the second stage cavity 142 that are capable of permitting hydraulic flow between the second stage cavity 142 and the cage central passage 136.

Located on the outside wall of the cage 124, between the tank port 122 and the second stage cavity 142, and on either side of the first stage cavity 138 and the pressure port cavity 132 are raised lands 146 annularly encircling the outside wall of the cage 124. The raised lands 146 have U-shaped troughs 148 for receiving resilient O-rings 150, preferably made of a resilient elastomer. When the sequential stepped directional control valve 110 is inserted into valve bore 116, the resilient O-rings 150 are compressed between the U-shaped troughs 148 of raised lands 146 and the inner wall of the valve bore 116 to form a tight seal that substantially prevents hydraulic fluid flow alongside the outside of the cage 124, that is, along the outside wall of the cage 124, for example, between adjacent ports and/or cavities.

Continuing to refer to FIGS. 1-3, cage central passage 136 is formed generally in the shape of a hollow circular cylinder oriented in an axial direction to receive a snugly fitting spool 152, which is capable of some movement back and forth within the cage central passage 136 in the axial direction. Spool 152 has a hollow central spool passage 154 extending substantially axially therethrough. The spool 152 has a proximal end 156 and a distal end 158. Formed through the distal end 158 of the spool 152 in the axial direction is a spool tank port 160 that allows hydraulic fluid to flow from the central spool passage 154 through the cage tank port 130 to the tank port 122.

Extending radially through the wall of spool 152 are one or more spool first stage ports 162 which permit hydraulic fluid to flow from the cage first stage ports 140 through the first stage spool ports 162 into the central spool passage 154 when the spool 152 is oriented in a manner such that spool first stage ports 162 are aligned with cage first stage ports 140, as illustrated in FIG. 1.

Similarly, extending in the radial direction through the wall of spool 152 are one or more spool second stage ports 164. Hydraulic fluid flow is permitted to flow from cage second stage ports 144 through spool second stage ports 164 into the central spool passage 154 when the spool second stage ports 164 are aligned with cage second stage ports 144, as illustrated in FIGS. 1 and 2.

Extending annularly around the spool 152, and formed between the outer wall of the spool 152 and the inner wall of the cage 124, that is, the wall of the cage central passage 136, is a first spool cavity 166 and a second spool cavity 168. Depending upon the orientation of the spool 152 within the cage 124, the first spool cavity 166 and the second spool cavity 168 may allow hydraulic fluid to flow: (1) from the pressure port 114 through the pressure port cavity 132 through cage first stage ports 140 into the aligned first spool cavity 166 out through the cage first stage ports 140 into the first stage cavity 138 and to the first stage port 118, when the spool 152 is in the first stage position or second stage position, as illustrated in FIGS. 2 and 3; and (2) from the first stage cavity 138 into the cage first stage ports 140 through the aligned second spool cavity 168 out through the cage second stage ports 144 to the second stage cavity 142 to the second stage port 120, when the spool 152 is in the second stage position, as illustrated in FIG. 3.

Attached to the proximal end 156 of spool 152 is plunger 170, which is magnetically responsive to a magnetic field generated through pull pole piece 174 when an electrical current is supplied to solenoid 172, which substantially annularly surrounds the pull pole piece 174. When an electrical current is provided to solenoid 172, pull pole piece 174 generates a magnetic force that pulls plunger 170 (and, hence, mechanically connected spool 152) toward the pull pole piece 174. A stronger electrical current applied to the solenoid 172 generates a stronger pulling force in pull pole piece 174 that pulls plunger 170 more towards the pole piece 174; conversely, a weaker electrical current applied to the solenoid 172 generates a weaker pulling force in pull pole piece 174 acting upon plunger 170, hence pulling it less.

Referring to FIG. 1, plunger 170 has a hollow plunger central passage 176. Plunger central passage 176 preferably accommodates the proximal end 156 of spool 152. Within the central spool passage 154 is second stage spring 178, preferably being a compression spring. The distal end of second stage spring 178 fits against second stage spring detent 180. Fitting within the hollow axial center of second stage spring 178 is generally pin-shaped spring stop 182. Spring stop 182 has a spring stop shoulder 184, preferably formed as an annular projection around spring stop 182 between the two ends of spring stop 182. Spring stop shoulder 184 restrains the proximal end of second stage spring 178, and receives the preload force imparted by second stage spring 178, transmitting that force to spring stop 182. Second stage spring 178 is preferably somewhat compressed between second stage spring detent 180 and spring stop shoulder 184, and therefore imparts a spring force on both. In the neutral position illustrated in FIG. 1, this spring force exerted by second stage spring 178 causes spring stop shoulder 184 to abut spring stop detent 186. Spring stop shoulder 184 is received within plunger 170. The proximal end 156 of spool 152 preferably effectively forms detent for spring stop shoulder 184, preventing excess movement of the spring stop 182 in the distal direction relative to the plunger 170. Plunger central passage 176 has formed within it a spring stop detent 186 preventing excess movement of the spring stop 182 in the proximal direction relative to the plunger 170.

On the proximal side of plunger 170, plunger central passage 176 preferably accommodates at least a portion of first stage spring 188, preferably a compression spring. Spring stop 182 extends at least partially through the hollow axial center of first stage spring 188. The distal end of first stage spring 188 abuts against the opposite side of spring stop shoulder 184 from second stage spring 178. Preferably, first stage spring detent 190 is formed as a cavity within pull pole piece 174. The proximal end of first stage spring 188 is retained by first stage spring detent 190. First stage spring 188 is preferably somewhat compressed between first stage spring detent 190 and spring step shoulder 184, and therefore imparts a spring force on both. Second stage spring 178 is stronger than first stage spring 188; thus, when no current is applied to solenoid 172, and no magnetic force is imparted on plunger 170 by pull pole piece 174, the second stage spring 178 overcomes the force imparted by first stage spring 188 on spring stop shoulder 184 and causes spring stop shoulder 184 to abut against spring stop detent 186. On the other hand, because plunger 170, spring stop 182, and spring stop shoulder 182 move axially together with attached spool 152, spring force exerted by first stage spring 188 upon spring stop shoulder 184 in the neutral position illustrated in FIG.1 causes the spool 152 to move to the maximum distal position, namely, the neutral position.

Referring to FIG. 1, spool stop 192 formed in cage 124 interacts with spool shoulder 194 formed in spool 152 to prevent the force imparted on the spool 152 by first stage spring 188 to cause spool 152 to move excessively toward or past the distal end 128 of cage 124. Pole piece shoulder 196 formed in pull pole piece 174 preferably interacts with plunger 170 to prevent plunger 170 and attached spool 152 from moving excessively toward the proximal end 126 of cage 124.

The embodiment of the sequential stepped directional control valve 110 described above and illustrated in FIGS. 1-3 operates in the manner described below.

Hydraulic fluid is provided under pressure to the sequential stepped directional control valve 110 via pressure port 114. Referring in particular to FIG. 1, when the solenoid 172 is a de-energized, that is, when no electrical current is applied to the solenoid 172, no magnetic pulling force is generated by pull pole piece 174. Plunger 170 is not then magnetically attracted to pull pole piece 174. With no magnetic force being imparted to overcome them, the combined spring forces applied by first stage spring 188 and second stage spring 178 cause spook 152 to move to the neutral position illustrated in FIG. 1, that is, they cause the distal end 158 of the spool 152 to move as far as it can toward the distal end 128 of case 124 until it is prevented from moving any farther in the distal direction by the interference interaction of spool stop 192 formed in cage 124 and spool shoulder 194 formed in spool 152. In that neutral position, the plunger 170 is in the maximum air gap position, that is, the air gap between the pull pole piece 174 and the plunger 170 is at its maximum when the sequential stepped directional control valve 110 is in the neutral position.

In the neutral position described above, and as illustrated in FIG. 1, hydraulic fluid under pressure is supplied by pressure port 114, filling pressure port cavity 132, which in turn causes pressurized hydraulic fluid to flow into cage pressure ports 134. Spool 152, however blocks the pressurized hydraulic fluid from flowing into the cage central passage 136, and thereby prevents the flow of pressurized hydraulic fluid from cage pressure ports 134 to either first stage port 118 or second stage port 120.

At the same time, in the neutral position, hydraulic fluid in first stage port 118 is free to flow from first stage port 118 to first stage cavity 138 and into cage first stage ports 140. Because the spool first stage ports 162 are aligned with cage first stage ports 140 in the neutral position, hydraulic fluid in cage first stage ports 140 is free to flow from cage first stage ports 140 through spool first stage ports 162 into the hollow central spool passage 154 to the spool tank port 160 through cage tank port 130 and then to the tank port 122. Because tank port 122 is connected to an unpressurized tank, hydraulic pressure in the first stage port 118 is relieved.

In a similar manner, in the neutral position, hydraulic fluid in second stage port 120 is free to flow to second stage cavity 142 and into cage second stage ports 144. In the neutral position, as illustrated in FIG. 1, spool second stage ports 164 are aligned with cage second stage ports 144, and therefore hydraulic fluid in cage second stage ports 144 flows through spool first stage ports 162 into central spool passage 154, and thereafter through spool tank port 160 through cage tank port 130 to tank port 122. The hydraulic fluid pressure in the second stage port 120 assumes the pressure of the tank as well, that is, the hydraulic pressure in second stage port 120 like the first stage port 118 is relieved. Because the hydraulic pressure is relieved in the first stage port 118 and the second stage port 120 in the neutral position, the hydraulic functions connected to the first stage port 118 and the second stage port 120 are thereby inactivated.

Referring to FIG. 2, in order to cause the sequential stepped directional control valve 110 to provide pressurized hydraulic fluid to actuate the first stage application, a first predetermined current is applied to the solenoid 172. The current in the solenoid 172 causes pull pole piece 174 to impart a magnetic pulling force upon plunger 170. Because the magnetic pulling force is stronger than the spring force imparted by first stage spring 188, the plunger 170 is magnetically pulled toward pull pole piece 174, and the spring force exerted by first stage spring 188 is partially overcome and compresses. The pull pole piece 174 continues to pull the plunger 170 toward pull pole piece 174 until the spring force in the compressed first stage spring 188 matches the magnetic pulling force exerted by the pull pole piece 174 upon the plunger 170. Second stage spring 178, in the compressed, preloaded position previously described, is preferably sufficiently strong to continue to push spring stop shoulder 184 against spring stop detent 186. The first predetermined current is selected so as to be sufficient to cause a sufficient magnetic field in pull pole piece 174 so as to cause the plunger 170 to move sufficiently close to pull pole piece 174 so that the spool 152 attached to the plunger 170 moves to the first stage position described in further detail below.

In the first stage position, as illustrated in FIG. 2, pressurized hydraulic fluid is supplied by pressure port 114, flowing through pressure port cavity 132 into case pressure ports 134. When the spool 152 is in the first stage position illustrated in FIG. 2, the spool 152 does not block the cage pressure ports 134. Instead, the spool 152 is oriented so that first spool cavity 166 is aligned with cage pressure ports 134. Consequently, pressurized hydraulic fluid flows from pressure port cavity 132 through cage pressure ports 134 into first spool cavity 166. First spool cavity 166 extends axially in the distal direction. When the spool 152 is in the first stage position, the first spool cavity 166 also is in hydraulic communication with first stage ports 140. First stage ports 140 thereupon allow pressurized hydraulic fluid to flow into first stage cavity 138, and then to first stage ports 118. Thus, to summarize, pressurized hydraulic fluid is supplied by pressure port 114 to cage pressure ports 134, then flows from the cage pressure ports 134 into the first spool cavity 166, and then out through the cage first stage ports 140 to the first stage cavity 138 and into the first stage port 118. The pressurized hydraulic fluid delivered through the first stage port 118 from the pressure port 114 via the sequential stepped directional control valve 110 in the first stage position causes the first stage hydraulic function to be operable. In the first stage position, as illustrated in FIG. 2, the spool 152 blocks the pressurized hydraulic fluid from reaching the cage second stage ports 144, the second stage cavity 142, or the second stage port 120.

At the same time, and throughout the transition from the neutral position (FIG. 1) to the first stage position illustrated in FIG. 1, spool second stage ports 164 continue to be aligned with cage second stage ports 144 so as to permit hydraulic fluid to flow from second stage port 120 through second stage cavity 142, then through cage second stage ports 144, then through aligned spool second stage ports 164, and then into the hollow central spool passage 154 to spool tank port 160 through cage tank port 130 and then to the tank port 122. The hydraulic fluid in the second stage port 120 thereby continues to assume the pressure of the tank, that is, hydraulic fluid pressure in the second stage port 120 is relieved, and the hydraulic functions connected to the second stage port 120 remain inactivated.

To actuate the second stage application, a second predetermined current is applied to solenoid 172. The second predetermined current is selected so as to be sufficient to cause a sufficient magnetic field to be generated by pull pole piece 174 so that the spool 152 attached to the plunger 170 moves to the second stage position described in further detail below.

Upon application of the second predetermined current to solenoid 172, the current in the solenoid 172 causes pull pole piece 174 to impart a stronger magnetic pulling force upon plunger 170 than occurred in the first stage position. As illustrated in FIG. 3, the magnetic pulling force upon plunger 170 causes the plunger 170 to be pulled to the minimum air gap position, that is, the air gap between the pull pole piece 174 and the plunger 170 is at its minimum when the sequential stepped directional control valve 110 is in the second stage position.

Referring to FIG. 3, as the second predetermined current is applied solenoid 172, and as plunger 170 is magnetically pulled further toward pull pole piece 174, the proximal end of spring stop 182 abuts first stage spring detent 190, and first stage spring 178 reaches its maximum compression. As plunger 170 continues to be magnetically pulled toward pull pole piece 174, spring stop shoulder 184 no longer abuts (it separates from) spring stop detent 186, and second stage spring 188 begins being further compressed between spring stop shoulder 184 and second stage spring detent 180 until the combined spring forces of first stage spring 188 and second stage spring counter balance the magnetic pulling force of pull pole piece 174 upon plunger 172 as a result of the second predetermined current, causing the spool 152 to be in the second stage position illustrated in FIG. 3 and described in further detail below.

In the second stage position illustrated in FIG. 3, once again pressurized hydraulic fluid is supplied by pressure port 114 and flows into pressure port cavity 132 and into cage pressure ports 134. Spool 152 does not block cage pressure ports 134; instead, the first spool cavity 166 continues to align with the cage pressure ports 134. Consequently, pressurized hydraulic fluid from cage pressure ports 134 flows into first spool cavity 166. In the second stage position illustrated in FIG. 3, first spool cavity 166 continues to be in hydraulic communication with first stage ports 140. Indeed, as can be seen by comparing FIGS. 2 and 3, the entire time that the spool 152 in sequential stepped directional control valve 110 transitions from the first stage position (FIG. 2) to the second stage position (FIG. 3), the first spool cavity continues to be hydraulically connected to both the cage pressure ports 134 (and thus to pressure port cavity 132 and pressure port 114) and to the cage first stage ports 140 (and thus to first stage cavity 138 and first stage port 120).

Thus, while the spool 152 is in the second stage position, and during the entire time that the spool 152 is transitioning from the first stage position to the second stage position, pressure port 114 is supplying pressurized hydraulic fluid to first stage port 118, flowing from the pressure port 114 through the pressure port cavity 132 through the cage pressure ports 134 into first spool cavity 166, then out from first spool cavity 166 through the cage first stage ports 140 into first stage cavity 138 and into first stage port 114, where it causes the hydraulic application connected to first stage port 114 to operate. Because pressurized hydraulic fluid is supplied continually to the first stage port 118 in the second stage position, in the first stage position, and the transition from the first stage to the second stage, the first stage application is capable of operation throughout those stages and the transition between them.

Referring again to FIG. 3, in the second stage position, second spool cavity 168 is oriented so that it permits hydraulic flow to it from first stage cavity 138 via the cage first stage ports 140, with which the second spool cavity 168 is aligned. As previously discussed, in the second stage position, first stage cavity 138 has pressurized hydraulic fluid supplied to it. At the same time, in the second stage position, second spool cavity 168 is oriented so that hydraulic fluid can flow from it to second stage cavity 142 (and thus to second stage port 120) via the cage second stage ports 144 with which the second spool cavity 168 is aligned. Thus, in the second stage position, pressurized hydraulic fluid in the first stage cavity 138 is in hydraulic communication with cage first stage ports 140. Pressurized hydraulic fluid therefore flows into aligned second spool cavity 168, and then from second spool cavity 168 out through cage second stage ports 144 into second stage cavity 142 and into second stage port 120 to render the hydraulic application that is hydraulically connected to second stage port 120 operational.

When the spool 152 is in the second stage position illustrated in FIG. 3, spool first stage ports 162 and spool second stage ports 164 are oriented in a manner so that the wall of the cage 124 blocks the flow of pressurized hydraulic fluid to or through spool first stage ports 162 and spool second stage ports 164. Consequently, there is no hydraulic path for hydraulic fluid to flow from first stage port 118 to tank port 122, or from second stage port 120 to tank port 122, that is, pressurized hydraulic fluid cannot flow via spool first stage ports 162 or spool second stage ports 164 through central spool passage 154 out through spool tank port 160, because the wall of the cage 124 blocks the passage through spool first stage ports 162 and spool second stage ports 164. As a result, the hydraulic pressure in the hydraulic fluid delivered to first stage port 118 and to second stage port 120 is not relieved, as it would have been if the pressurized hydraulic fluid flowed between them and the tank port 122.

Importantly, as described above and as illustrated in FIGS. 2 and 3, as the sequential stepped directional control valve 110 of the present invention transitions from the first stage position to the second stage position, at no time is the flow of pressurized hydraulic fluid to the first stage port 118 discontinued or interrupted, that is, at no time during the transition does the sequential stepped directional control valve 110 transition through a neutral position.

This is a unique and important feature of the present invention. Assume, for example, that sequential stepped directional control valve 110 of the present invention was connected hydraulically to an engine brake with the first stage port 118 being hydraulically connected to a light engine brake function, and the second stage port 120 being hydraulically connected to a heavy engine brake function. In the neutral position, no engine braking would be applied. If the equipment operator chose to lightly brake the engine, the first predetermined current would be applied to the solenoid 172 in the sequential stepped directional control valve 110 causing pressurized hydraulic fluid to flow through the first stage port 118. Light engine braking would occur.

If an emergency were then to arise, requiring the operator to apply heavy engine braking, it would be disadvantageous (and potentially dangerous, even deadly) for the operator to be required to transition through a neutral (i.e. non-braking) valve cycle prior to achieving heavy braking, as was required in prior art valves. Instead, with the present invention, when the second predetermined current was applied to the solenoid 172, the hydraulic fluid pressure to the first stage port 118 (resulting in light engine braking) would be maintained the entire time until (and after) the spool 152 transitioned to the second stage position, resulting in pressurized hydraulic fluid being delivered to the second stage port 120 (resulting in heavy engine braking being added to the light engine braking). No neutral, non-braking condition would be required during the transition, and thus safer engine braking would be achieved due to the uninterrupted braking.

Persons skilled in the art will recognize that the uninterrupted flow of pressurized hydraulic fluid to the first stage port 118 while the spool 152 transitions from the first stage position to the second stage position (at which time the flow of pressurized hydraulic fluid to the second stage port 120 commences) is advantageous, or even necessary, in a wide range of hydraulic applications other than the engine brake example provided herein.

Skilled practitioners will also recognize that, while the embodiment described and illustrated herein is a two stage sequential stepped directional control valve 110, alternative embodiments, including additional stages, can be added to the valve without departing from the scope of the invention. As additional stages are added, the total number of stages is only limited by the amount of current that can be driven to the solenoid 172 and the design of the spool type directional valve. Skilled practitioners will recognize that each additional sequential stepped directional control position would require an additional sequential bias spring and stop, preloaded with increasing load per stage or operating position.

Referring to FIGS. 1-3, the embodiment of the invention illustrated and/or described herein has multiple cage pressure ports 134, cage first stage ports 140, cage second stage ports 144, spool first stage ports 162, and spool second stage ports 164 extending in multiple radial directions from the cage 124 and the spool 152, respectively, formed around the axial center line illustrated by the broken line. While this is preferred, persons skilled in the art will recognize that either one, or more than one of the above-described parts may be used in the sequential stepped directional control valve 110 without departing from the scope of the invention described herein.

In the above-referenced embodiments, the electrical current applied to the solenoid 172 to generate a magnetic pulling force in pull pole piece 174 would be direct current. Additionally, persons skilled in the art will recognize that proportional position control within the stages described herein can be achieved with the present invention by applying Pulse Width Modulated current to the coil of the solenoid 172. The amount of proportional control thus achieved is limited by the spring rates of each of the stage bias springs. The greater the spring rate, the greater the proportional control within the operating position or stage.

While the above-described embodiments of the sequential stepped directional control valve 110 have been found and are believed to be useful and preferable, particularly in certain applications involving, for example, engine braking, skilled practitioners will recognize that other combinations of elements, dimensions, or materials can be utilized, and other equipment applications can be realized, without departing from the invention claimed herein. Moreover, although certain embodiments of the invention have been described by way of example, it will be understood by skilled practitioners that modifications may be made to the described embodiments without departing from the scope of the invention, which is defined by the claims.

Having thus described exemplary embodiments of the invention, that which is desired to be secured by Letters Patent is claimed below.

I claim:

1. A sequential stepped directional control valve having at least three operating positions, in which one of the operating positions is a neutral position, comprising:
   (A) a hollow cage having an axial direction and a radial direction, the cage being pierced by a cage pressure port, by a cage first stage port, by a cage second stage port, and by a cage pump port, and the cage having a hollow cage central passage;
   (B) a spool adapted to fit snugly within the cage in which location the spool is moveable relative to the cage in a direction substantially parallel to the axial direction of the cage;
   (C) a solenoid coil substantially annularly surrounding a pole piece adapted to produce a magnetic force in response to an electrical current applied to the solenoid coil;
   (D) a magnetically responsive plunger attached to the spool, the plunger being magnetically responsive to the magnetic force produced by the pole piece;
   (E) one or more springs within the sequential stepped directional control valve directly or indirectly biasing the spool;
   (F) wherein (1) when no electrical current is applied to the solenoid coil, the springs within the sequential stepped directional control valve directly or indirectly bias the spool such that the spool is located in the neutral position; (2) when a first predetermined electrical current is applied to the solenoid coil, the magnetic force produced in the pole piece acts upon the plunger to counteract the biasing caused by the springs directly or indirectly upon the spool so as to cause the plunger to move to a position within the sequential stepped directional control valve such that the spool attached to the plunger is located in a first stage operating position different from the neutral position; and (3) when a second predetermined electrical current is applied to the solenoid coil, the magnetic force produced in the pole piece acts upon the plunger to counteract the biasing caused by the springs directly or indirectly upon the spool so as to cause the plunger to move to a position within the sequential stepped directional control valve such that the spool attached to the plunger is located in a second stage operating position different from the neutral position and different from the first stage operating position; and (G) wherein (1) when the spool is in the neutral position, the spool acts to block hydraulic fluid under pressure from entering the cage central passage of the sequential stepped directional control valve through the cage pressure port, the spool allows hydraulic fluid to flow through the cage first stage port into the sequential stepped directional control valve and the spool directs the hydraulic fluid entering the cage first stage port into the sequential stepped directional control valve to flow out of the sequential stepped directional control valve through the tank port, and the spool allows hydraulic fluid to flow through the cage second stage port into the sequential stepped directional control valve and the spool directs hydraulic fluid entering the second stage port into the sequential stepped directional control valve to flow out of the sequential stepped directional control valve through the tank port; (2) when the spool is in the first stage operating position, the spool allows hydraulic fluid under pressure to flow through the cage pressure port into the sequential stepped directional control valve and the spool directs the hydraulic fluid under pressure entering the cage pressure port to flow out of the sequential stepped directional control valve through the cage first stage port, the spool allows hydraulic fluid to flow through the cage second stage port into the sequential stepped directional control valve and the spool directs hydraulic fluid entering the second stage port into the sequential stepped directional control valve to flow out of the sequential stepped directional control valve through the tank port, and the spool blocks hydraulic fluid from the cage first stage port from flowing out of the sequential stepped directional control valve through the tank port; and (3) when the spool is in the second stage operating position, the spool allows hydraulic fluid under pressure to flow through the cage pressure port into the sequential stepped directional control valve and the spool directs the hydraulic fluid under pressure entering the cage pressure port to flow out of the sequential stepped directional control valve through the cage first stage port and through the cage second stage port, and the spool blocks hydraulic fluid from the cage first stage port and from the cage second stage port from flowing out of the sequential stepped directional control valve through the tank port.

2. The sequential stepped directional control valve of claim 1 wherein the spool moves from the first stage operating position to the second stage operating position without ever being in the neutral position.

3. The sequential stepped directional control valve of claim 1 wherein the spool moves from the first stage operating position to the second stage operating position without interrupting the flow of hydraulic fluid under pressure from flowing through the cage pressure port into the sequential stepped directional control valve and without interrupting the direction by the spool of the hydraulic fluid under pressure entering the cage pressure port to flow out of the sequential stepped directional control valve through the cage first stage port.

4. The sequential stepped directional control valve of claim 2 wherein the cage is pierced by a cage pressure port in substantially the radial direction, the cage is pierced by a cage first stage port in substantially the radial direction, the cage is pierced by a cage second stage port in substantially the radial direction, and the cage is pierced by a cage pump port in substantially the axial direction.

5. The sequential stepped directional control valve of claim 3 wherein the cage is pierced by a cage pressure port in substantially the radial direction, the cage is pierced by a cage first stage port in substantially the radial direction, the cage is pierced by a cage second stage port in substantially the radial direction, and the cage is pierced by a cage pump port in substantially the axial direction.

6. The sequential stepped directional control valve of claim 4 wherein the pole piece is a pull pole piece, and the magnetic force produced in response to electrical current being applied to the solenoid coil acts to pull the plunger and the spool attached to the plunger toward the pull pole piece.

7. The sequential stepped directional control valve of claim 5 wherein the pole piece is a pull pole piece, and the magnetic force produced in response to electrical current being applied to the solenoid coil acts to pull the plunger and the spool attached to the plunger toward the pull pole piece.

8. The sequential stepped directional control valve of claim 6 wherein (A) the second predetermined electrical current is greater than the first predetermined electrical current; (B) the plunger is closer to the pull pole piece when the spool attached to the plunger is in the second operating position than when the spool attached to the plunger is in the first operating position; and (C) the plunger is closer to the pull pole piece when the spool attached to the plunger is in the first operating position than when the spool attached to the plunger is in the neutral position.

9. The sequential stepped directional control valve of claim 7 wherein (A) the second predetermined electrical current is greater than the first predetermined electrical current; (B) the plunger is closer to the pull pole piece when the spool attached to the plunger is in the second operating position than when the spool attached to the plunger is in the first operating position; and (C) the plunger is closer to the pull pole piece when the spool attached to the plunger is in the first operating position than when the spool attached to the plunger is in the neutral position.

10. A sequential stepped directional control valve having at least three operating positions, in which one of the operating positions is a neutral position, comprising:

(A) a hollow cage having an axial direction and a radial direction substantially transverse to the axial direction of the cage, the cage having an outer cage wall, the cage having in inner cage wall defining a hollow cage central passage, the cage being pierced by a cage pressure port connecting the outer cage wall and the cage central passage, by a cage first stage port connecting the outer cage wall and the cage central passage, by a cage second stage port connecting the outer cage wall and the cage central passage, and by a cage pump port connecting the outer cage wall and the cage central passage;

(B) a spool adapted to fit snugly within the cage in which location the spool is moveable relative to the cage in a direction substantially parallel to the axial direction of the cage, the spool having an axial direction substantially parallel to the axial direction of the cage and a radial direction substantially parallel to the radial direction of the cage, the spool having a outer spool wall, the spool further having a hollow central spool passage extending in a direction substantially parallel with the axial direction of the cage, the spool being pierced by a spool first stage port connecting the outer spool wall and the central spool passage, the spool being pierced by a spool second stage port connecting the outer spool wall and the central spool passage, and the spool being pierced by a spool tank port connecting the outer spool wall and the central spool passage;

(C) the spool having (1) a first spool cavity comprising a first radially inward indentation of the outer spool wall wherein, when the spool is within the cage, the first radially inward indentation of the outer spool wall interacting with the inner cage wall to define a cavity between the spool outer wall and the cage inner wall, and (2) a second spool cavity comprising a second radially inward indentation of the outer spool wall wherein, when the spool is within the cage, the second radially inward indentation of the outer spool wall interacting with the inner cage wall to define a cavity between the spool outer wall and the cage inner wall;

(D) a solenoid coil substantially annularly surrounding a pole piece adapted to produce a magnetic force in response to an electrical current applied to the solenoid coil;

(E) a magnetically responsive plunger attached to the spool, the plunger being magnetically responsive to the magnetic force produced by the pole piece;

(F) one or more springs within the sequential stepped directional control valve directly or indirectly biasing the spool in the axial direction of the spool;

(G) wherein (1) when no electrical current is applied to the solenoid coil, the springs within the sequential stepped directional control valve directly or indirectly bias the spool such that the spool is located in the neutral position; (2) when a first predetermined electrical current is applied to the solenoid coil, the magnetic force produced in the pole piece acts upon the plunger to counteract the biasing caused by the springs directly or indirectly upon the spool so as to cause the plunger to move to a position within the sequential stepped directional control valve such that the spool attached to the plunger is located in a first stage operating position different from the neutral position; and (3) when a second predetermined electrical current is applied to the solenoid coil, the magnetic force produced in the pole piece acts upon the plunger to counteract the biasing caused by the springs directly or indirectly upon the spool so as to cause the plunger to move to a position within the sequential stepped directional control valve such that the spool attached to the plunger is located in a second stage operating position different from the neutral position and different from the first stage operating position; and (H) wherein (1) when the spool is in the neutral position (a) the spool blocks hydraulic fluid under pressure from entering the cage central passage of the sequential stepped directional control valve through the cage pressure port, (b) the spool first stage port is aligned with the cage first stage port and the spool tank port is aligned the with cage tank port, so that hydraulic fluid may flow through the cage first stage port and through the aligned spool first stage port into the central spool passage and from the central spool passage through the spool tank port and out of the sequential stepped directional control valve through the cage tank port aligned with the spool tank port, (c) the spool second stage port is aligned with the cage second stage port, so that hydraulic fluid may flow through the cage second stage port and through the aligned spool second stage port into the central spool passage and from the central spool passage through the spool tank port and out of the sequential stepped directional control valve through the cage tank port aligned with the spool tank port; (2) when the spool is in the first stage operating position (a) the first spool cavity is simultaneously aligned with both the cage pressure port and the cage first stage port, resulting in hydraulic fluid under pressure flowing into the sequential stepped directional control valve through the cage pressure port into the first spool cavity, and hydraulic fluid under pressure in the first spool cavity flowing out of the sequential stepped directional control valve through the cage first stage port with which the first spool cavity is aligned, (b) the spool first stage port is blocked by the cage inner wall, (c) the spool second stage port is aligned with the cage second stage port and the spool tank port is aligned the with cage tank port, so that hydraulic fluid may flow through the cage second stage port and through the aligned spool second stage port into the central spool passage and from the central spool passage through the spool tank port and out of the sequential stepped directional control valve through the cage tank port aligned with the spool tank port; and (3) when the spool is in the second stage operating position (a) the first spool cavity is simultaneously aligned with both the cage pressure port and the cage first stage port, resulting in hydraulic fluid under pressure flowing into the sequential stepped directional control valve through the cage pressure port into the first spool cavity, and hydraulic fluid under pressure in the first spool cavity flowing out of the sequential stepped directional control valve through the cage first stage port with which the first spool cavity is aligned, (b) the second spool cavity is simultaneously aligned with both the cage first stage port and the cage second stage port, resulting in hydraulic fluid under pressure in the cage first stage port flowing into the second spool cavity, and hydraulic fluid under pressure in the second spool cavity flowing out of the sequential stepped directional control valve through the cage second stage port with which the second spool cavity is aligned, and (c) the spool first stage port and the spool second stage port are blocked by the cage inner wall.

11. The sequential stepped directional control valve of claim 10 wherein the spool moves from the first stage operating position to the second stage operating position without ever being in the neutral position.

12. The sequential stepped directional control valve of claim 10 wherein the spool moves from the first stage operating position to the second stage operating position without interrupting the flow of hydraulic fluid under pressure from flowing through the cage pressure port into the sequential stepped directional control valve and without interrupting the flow of hydraulic fluid under pressure out of the sequential stepped directional control valve through the cage first stage port.

13. The sequential stepped directional control valve of claim 11 wherein the cage is pierced by a cage pressure port in substantially the radial direction, the cage is pierced by a cage first stage port in substantially the radial direction, the cage is pierced by a cage second stage port in substantially the radial direction, and the cage is pierced by a cage pump port in substantially the axial direction.

14. The sequential stepped directional control valve of claim 12 wherein the cage is pierced by a cage pressure port in substantially the radial direction, the cage is pierced by a cage first stage port in substantially the radial direction, the cage is pierced by a cage second stage port in substantially the radial direction, and the cage is pierced by a cage pump port in substantially the axial direction.

15. The sequential stepped directional control valve of claim 13 wherein (A) the pole piece is a pull pole piece, and the magnetic force produced in response to electrical current being applied to the solenoid coil acts to pull the plunger and the spool attached to the plunger toward the pull pole piece; and (B) the springs within the sequential stepped directional control valve directly or indirectly bias the spool in the axial direction of the spool in a direction away from the pull pole piece.

16. The sequential stepped directional control valve of claim 14 wherein (A) the pole piece is a pull pole piece, and the magnetic force produced in response to electrical current being applied to the solenoid coil acts to pull the plunger and the spool attached to the plunger toward the pull pole piece; and (B) the springs within the sequential stepped directional control valve directly or indirectly bias the spool in the axial direction of the spool in a direction away from the pull pole piece.

17. The sequential stepped directional control valve of claim 15 wherein (A) the second predetermined electrical current is greater than the first predetermined electrical current; (B) the plunger is pulled closer to the pull pole piece when the second predetermined current is applied to the solenoid coil resulting in the spool attached to the plunger being in the second operating position than when the first predetermined is applied to the solenoid coil resulting in the spool attached to the plunger being in the first operating position; and (C) the plunger is pulled closer to the pull pole piece when the first predetermined is applied to the solenoid coil resulting in the spool attached to the plunger being in the first operating position than when the spool attached to the plunger is in the neutral position.

18. The sequential stepped directional control valve of claim 16 wherein (A) the second predetermined electrical current is greater than the first predetermined electrical current; (B) the plunger is pulled closer to the pull pole piece when the second predetermined current is applied to the solenoid coil resulting in the spool attached to the plunger being in the second operating position than when the first predetermined is applied to the solenoid coil resulting in the spool attached to the plunger being in the first operating position; and (C) the plunger is pulled closer to the pull pole piece when the first predetermined is applied to the solenoid coil resulting in the spool attached to the plunger being in the first operating position than when the spool attached to the plunger is in the neutral position.

19. The sequential stepped directional control valve of claim 1 wherein intermediate proportional position control occurs within a first stage operating position or within a second stage operating position by applying pulse width modulated current to the solenoid coil.

20. The sequential stepped directional control valve of claim 10 wherein intermediate proportional position control occurs within a first stage operating position or within a second stage operating position by applying pulse width modulated current to the solenoid coil.

* * * * *